Dec. 18, 1923.
A. L. ZIMMERMAN
ENGINE TESTING PUMP
Filed Jan. 7, 1920
1,477,796
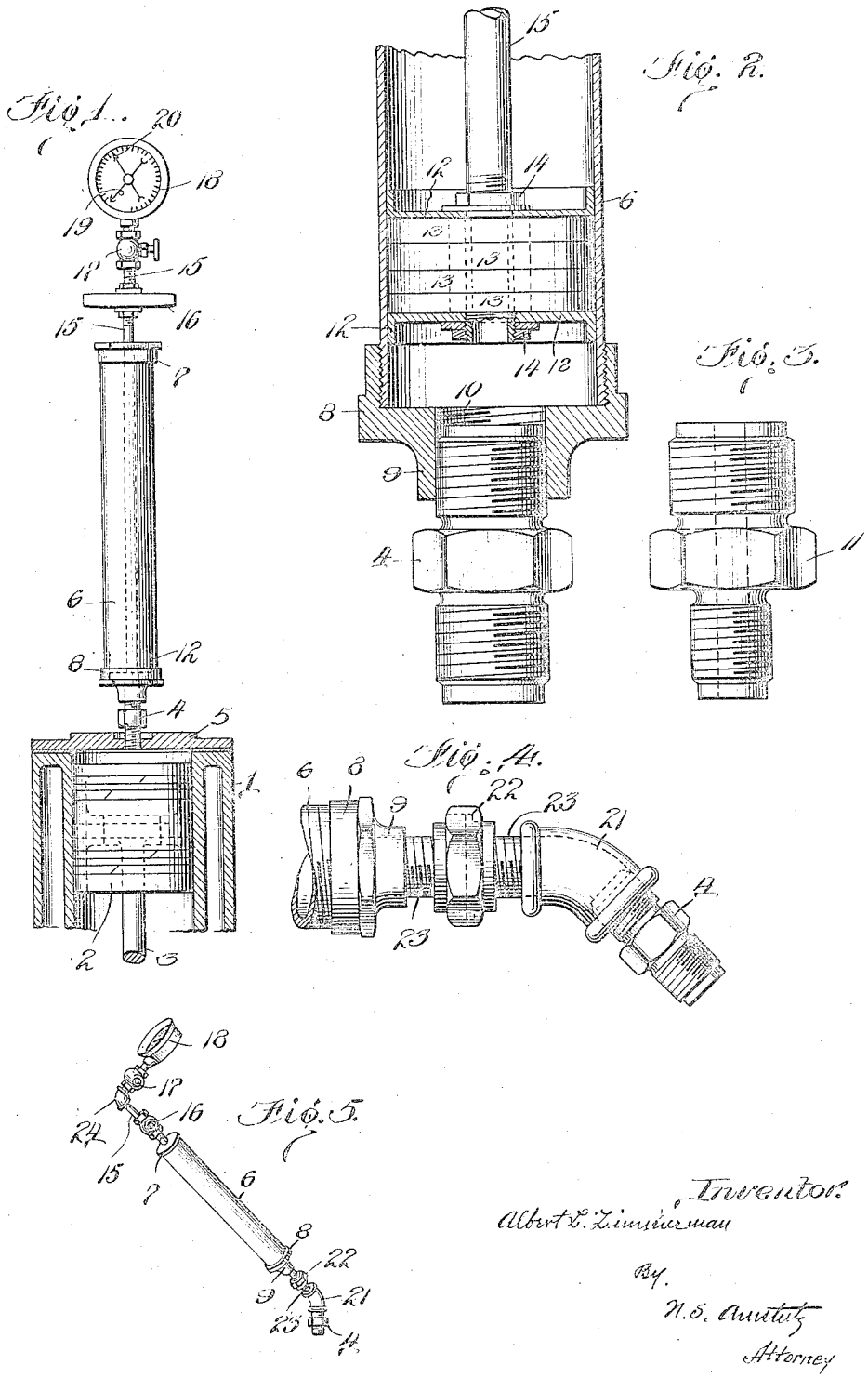
Inventor
Albert L. Zimmerman
By
N. S. Anstutz
Attorney Patented Dec. 18, 1923.

1,477,796

UNITED STATES PATENT OFFICE.

ALBERT L. ZIMMERMAN, OF VALPARAISO, INDIANA.

ENGINE-TESTING PUMP.

Application filed January 7, 1920. Serial No. 350,000½.

*To all whom it may concern:*

Be it known that ALBERT L. ZIMMERMAN, citizen of the United States, residing at Valparaiso, in the county of Porter and State of Indiana, has invented certain new and useful Improvements in Engine-Testing Pumps, of which the following is a specification.

My invention relates to engine testing pumps and it includes the features listed in the following preamble which with others are pointed out in the annexed claims.

The purpose of my invention is to provide a pump for testing internal combustion or any other type of engine of which it is desired to ascertain its mechanical conditions without dismantling it in advance; to provide a pump with interchangeable adapters so as to make the same available for different sized cylinder openings; to provide a pump with a combined indicating and recording gauge to continuously indicate the pressure conditions under which or to which the pump is being applied; that provides for its operation at an angle to the engine cylinder; which also places the gauge at an angle to the pump when it is at an angle to the cylinder so as to make the gauge indications more easily read; to also provide a pump plunger or piston which carries multiple disks between the inner and the outer leather disks to act as lubricator distributers in order to hold a uniformly non-leaking plunger, and in consequence of these and other related features enables one to quickly detect leaky valves, defective piston rings, loose wrist pins, worn pistons, loose connecting rods, worn main bearings and the actual compression conditions of each cylinder to which the pump may be attached.

With these and other purposes in view I illustrate in the accompanying drawing such instances of adaptation as will disclose the broad underlying features without limiting myself to the specific details shown in the exemplifications.

Fig. 1 is a side elevation of a pump attached in parallel relation to an engine cylinder.

Fig. 2 is an enlarged view of the lower end of a pump, in section showing the piston and an adapter.

Fig. 3 is a side elevation of a different sized adapter.

Fig. 4 is a side elevation of an angular adapted attachment.

Fig. 5 is a diagrammatic view, in elevation, of a pump attached at an angle to the cylinder and the gauge at an angle to both the pump and the cylinder.

In carrying the invention into practice I may use any form of pump to which a pressure gauge is attached and which may be secured to various cylinder openings by means of adapters. It is immaterial as to the specific type of adapters, pump or gauge, etc., that is used so long as the pump is free from leakage.

In the instances of adaptation shown in the drawing an engine cylinder 1 with its enclosed piston 2 attached to connecting rod 3 is shown with an adapter 4 screwed into a spark plug opening in the cylinder head 5. The pump barrel 6 has a cap 7 at its outer end and a cap 8 at its inner or nominally lower end. This latter cap has an extension 9 that is threaded internally at 10 to receive a threaded end of various adapters, nipples, etc., or other fittings. The adapter 11 shown in Fig. 3 is for a smaller sized spark plug opening than the adapter 4.

The pump barrel 6 contains the plunger or piston which may be of any desired type. I have however found the form instanced in Fig. 2 to be singularly free from leaks. It comprises "end" leathers 12 between which a series of metallic rings 13 are placed loosely or clamped between the leathers by nuts 14 that are screwed onto the bottom end of the hollow stem 15 above and below the piston.

The hollow tubular stem 15 passes loosely through the guiding cap 7. A short distance above this cap when the piston is fully depressed, a handle 16 is attached to the stem 15 by means of which the pump is operated. The stem 15 above the handle enters a shut-off valve 17. This valve is connected to a gauge 18 which is provided with two pointers, one to indicate variations of pressure shown at 19 and another to show maximum pressures at 20.

Whenever the pump is to be used at an angle, fittings similar to those shown in Fig. 4 may be used. In this exemplification the adapter 4 is screwed into an elbow 21 of about 45 degrees or any other desired angle. A union 22 may connect the elbow 21 to the pump cap 8 in conjunction with nipples 23. It is of course understood that these fittings can be varied at will to suit any group or single set of conditions.

In Fig. 5 the gauge 18 is shown at an angle to both the pump 6 and the cylinder 1. This may be done to make the gauge dial easier to read. An elbow 24 is placed between the valve 17 and the handle 16. This elbow may be placed between the valve 17 and the gauge 18 if desired. The valve 17 may also, if more convenient to operate, be combined with the handle 16 in any desired operative relation so that it can be manipulated at any point of the piston stroke without removing one of the hands from the handle 16.

When leakage tests are being made the piston 12 is pressed its full extent into the barrel 6 thus registering the maximum pressure produced thereby on the gauge 16 and so long as the handle 16 is held in its depressed position, the gauge 18 will register the pressure produced If there is a leak anywhere in the system, the pressure will be reduced and this reduction will be indicated on the gauge. This of course necessitates the retention of the piston 12 and handle 16 in their extreme lowered position by not releasing the handle 16. If the pressure indicated on the gauge 18 reduces rapidly, then the leak is serious. On the other hand, if the pressure reduces very slowly while the position of the piston remains unchanged the leak may be so slight as to require no repairs whatever. In order to avoid the necessity of the operator holding the handle 16 depressed during this or similar tests, any suitable well known means, not shown, may be used to lock the handle in its extreme downward position.

With a pump of this type all the usual defects of internal combustion engines can be located in advance of any disassembling. This is exceedingly important for not infrequently without having access to a pump for diagnosis a main bearing, or connecting rod may be suspected without being able to determine which bearing or which rod is in need of attention; consequently the cost of repairs becomes excessive and the risk of having the parts misassembled is incurred. Instead of leaky piston rings, leaky valves may be the cause of defective compression. Without a testing pump there is no way of locating this kind of trouble other than to tear down the parts. By leaving the valve 17 open and cranking the engine the actual compression condition can quickly be ascertained for each cylinder, and in case of irregularities, the defect is located and the proper remedy applied.

What I claim is:

1. In engine testers, positive attachable and detachable pressure producing means such as a pump, etc., pressure indicating means comprising maximum and variable indicators operatively connected to said pump, and interchangeable adapters serving to connect the pump with various engine cylinders.

2. In engine testers, a hand pump comprising a suitable casing provided with a piston, a hollow stem leading from in front of the piston to the outside of the casing, an indicating gage attached to the stem, an operating handle secured to the stem between the gage and the casing, maximum and variable indicators within the gage, and interchangeable adapters serving to connect the pump with various engine cylinders.

3. In engine testers, attachable and detachable pressure producing means, a gauge in operative relation to such means said gauge being adapted to indicate fluctuations of pressure and also automatically record the maximum pressure, and means for connecting and disconnecting the gauge from the pressure means.

4. In engine testers, detachable pressure producing means, interchangeable adapters at one end thereof, a pressure gauge connected at the other end, and an angular connection between the gauge and the pressure means.

5. In engine testers, detachable pressure producing means, pressure responsive means connected therewith, and angular terminal connections including interchangeable adapters attachably and detachably connected to the pressure producing means.

6. In engine testers, a pump barrel, a piston, a handle, a hollow stem connecting the same and extending through both and a controlled gauge connected with the stem at its end removed from the piston.

7. In engine testers, a pump, a piston, a hollow stem passing through the piston, a casing for the piston, a handle attached to the stem outside of the casing, and interchangeable terminal adapters cooperating with the piston end of the casing.

8. In engine testers, means for producing pressure, interchangeable connectors therefor, and means for indicating the maximum extent and changes of such pressure.

9. In engine testers, means for producing pressure, means for positively attaching the same to existing openings leading into the engine, and interchangeable adapters for connecting the pressure producing means to different kinds of engine openings.

In testimony whereof I affix my signature.

ALBERT L. ZIMMERMAN.